No. 684,966. Patented Oct. 22, 1901.
A. WEISENBACK.
EGG OR CAKE BEATER.
(Application filed Jan. 18, 1900.)
(No Model.)
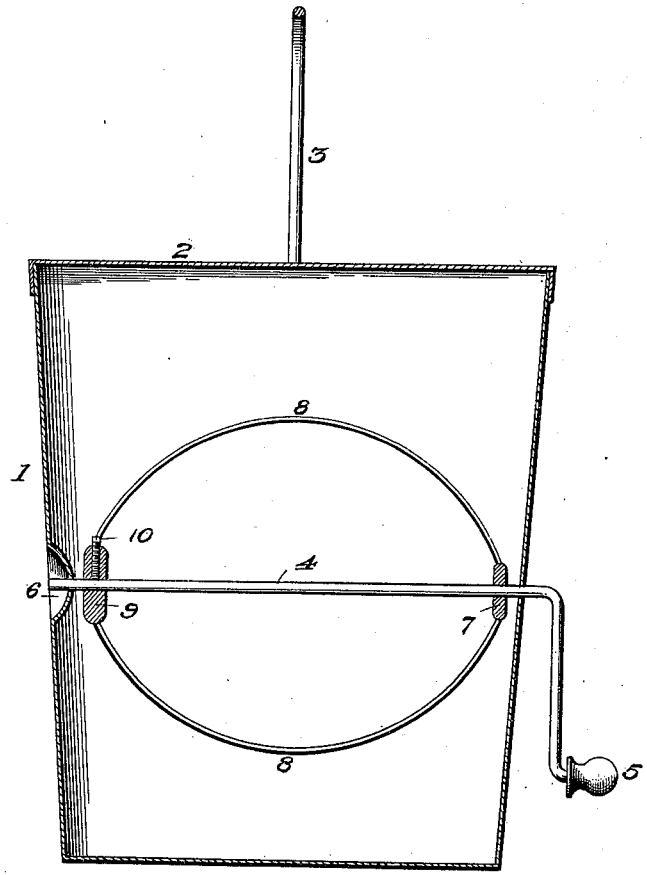

UNITED STATES PATENT OFFICE.

AMBERSINE WEISENBACK, OF REEDVILLE, OREGON.

EGG OR CAKE BEATER.

SPECIFICATION forming part of Letters Patent No. 684,966, dated October 22, 1901.

Application filed January 18, 1900. Serial No. 1,842. (No model.)

*To all whom it may concern:*

Be it known that I, AMBERSINE WEISENBACK, a citizen of the United States, residing at Reedville, in the county of Washington and State of Oregon, have invented certain new and useful Improvements in Egg or Cake Beaters; and I do declare the following to be a full, clear, and exact description of the invention, such as will enable others skilled in the art to which it appertains to make and use the same.

My invention relates to a novel improvement in egg and cake beaters or mixers; and the object is to simplify and improve the construction, increase the utility and efficiency, and provide an inexpensive, convenient, and durable device of this character.

To this end the invention consists in the construction, combination, and arrangement of the several elements of the device, as will be hereinafter more fully described, and particularly pointed out in the claim.

The figure in the drawing is a vertical section of an egg and cake beater or mixer embodying my invention.

1 denotes a suitable sheet-metal vessel provided with a cover 2 and handle 3.

4 denotes a transverse crank-shaft provided with a handle 5, the shaft extending through the walls of the vessel, with its inner end journaled in a bearing 6, formed by indenting the wall, as shown.

7 denotes a hub loosely encompassing the shaft 4, and from it a series of flexible bowed wires 8 8 extend to a larger hub 9, adjustably secured on the shaft 4 by means of the set-screw 10.

It will be seen that the device is extremely simple in construction and that the parts may be readily assembled by unskilled labor, it being only necessary to pass the end of the crank-shaft through the bearing in one side of the vessel, then through the hubs of the spider, and into the bearing at the other side of the vessel. The shaft is held from accidental displacement by the hubs of the spider, but may be readily removed for cleaning the vessel by simply releasing the shaft from the grip of the set-screw 10.

The flexible wires and hubs constitute the beater-spider, by means of which the contents of the vessel may be efficiently agitated or mixed to produce the desired result.

The adjustability of the hub 9 longitudinally of the shaft provides for increasing or decreasing the lateral area of the spider-arms, as will be apparent.

The accompanying drawing shows my invention in the best form now known to me; but various changes in the details may be made within the skill of a good mechanic without departing from the spirit of my invention.

Having thus fully described my invention, what I claim as new and useful, and desire to secure by Letters Patent of the United States, is—

A beater or mixer comprising a vessel having alined bearings, a removable shaft journaled in said bearings, a beater-spider mounted on said shaft, said spider consisting of end hubs and bowed spring-arms secured in said hubs; one of the hubs being adjustably secured to the shaft.

In testimony whereof I have hereunto set my hand in presence of two subscribing witnesses.

AMBERSINE WEISENBACK.

Witnesses:
EMMA DANT,
CHRISTINA IMLAY.